United States Patent
Choi et al.

(10) Patent No.: US 12,126,004 B2
(45) Date of Patent: Oct. 22, 2024

(54) FABRICATION OF Si-MWCNT NANOCOMPOSITES (SMC) AS ANODES FOR LITHIUM-ION BATTERIES

(71) Applicants: HEIDRON ENERGY RESEARCH & CONSULTANCY CO LLC, Abu Dhabi (AE); KHALIFA UNIVERSITY OF SCIENCE AND TECHNOLOGY, Abu Dhabi (AE)

(72) Inventors: Daniel Sunghoi Choi, Abu Dhabi (AE); Aamna Hameed Khan, Abu Dhabi (AE)

(73) Assignees: HEIDRON ENERGY RESEARCH & CONSULTANCY CO LLC, Abu Dhabi (AE); KHALIFA UNIVERSITY OF SCIENCE AND TECHNOLOGY, Abu DHabi (AE)

( * ) Notice: Subject to any disclaimer, the term of this patent is extended or adjusted under 35 U.S.C. 154(b) by 0 days.

(21) Appl. No.: 18/089,115

(22) Filed: Dec. 27, 2022

(65) Prior Publication Data

US 2024/0213442 A1    Jun. 27, 2024

(51) Int. Cl.
| | |
|---|---|
| *H01M 4/133* | (2010.01) |
| *B82Y 30/00* | (2011.01) |
| *B82Y 40/00* | (2011.01) |
| *H01M 4/04* | (2006.01) |
| *H01M 4/134* | (2010.01) |
| *H01M 4/1393* | (2010.01) |
| *H01M 4/1395* | (2010.01) |
| *H01M 4/62* | (2006.01) |
| *H01M 4/66* | (2006.01) |
| *H01M 4/70* | (2006.01) |
| *H01M 4/02* | (2006.01) |
| *H01M 10/0525* | (2010.01) |

(52) U.S. Cl.
CPC ............ *H01M 4/133* (2013.01); *B82Y 30/00* (2013.01); *B82Y 40/00* (2013.01); *H01M 4/0409* (2013.01); *H01M 4/134* (2013.01); *H01M 4/1393* (2013.01); *H01M 4/1395* (2013.01); *H01M 4/622* (2013.01); *H01M 4/661* (2013.01); *H01M 4/70* (2013.01); *H01M 2004/027* (2013.01); *H01M 10/0525* (2013.01)

(58) Field of Classification Search
None
See application file for complete search history.

(56) References Cited

U.S. PATENT DOCUMENTS

2016/0104554 A1* 4/2016 Zhong ............... B29C 39/14
                                                    252/511
2019/0123339 A1* 4/2019 Yushin ............... H01M 4/625

* cited by examiner

*Primary Examiner* — Tracy M Dove

(57) ABSTRACT

There is disclosed a hybrid composite anode for lithium-ion batteries comprising silicon nanoparticles, multi-walled carbon nanotube (MWCNTs) flakes, and a polymer binder which enables enhanced capacity retention of the hybrid composite anode. A process of fabrication of an anode for a lithium-ion battery is also disclosed, the process comprising the steps of fabricating carbon nanotube (CNT) mats on an anode current collector; dispersing the fabricated CNT mats in a mixture of deionized (DI) water to ethanol using a probe sonicator and magnetic stirrer; and adding silicon nanoparticles, multi-walled carbon nanotube (MWCNTs) flakes, and a polymer binder to the mixture, forming Si-MWCNT nanocomposite (SMC) anodes.

7 Claims, 2 Drawing Sheets

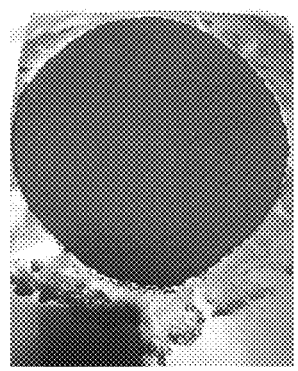
Fig. 4
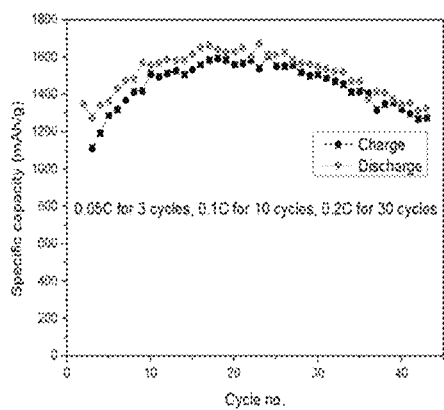 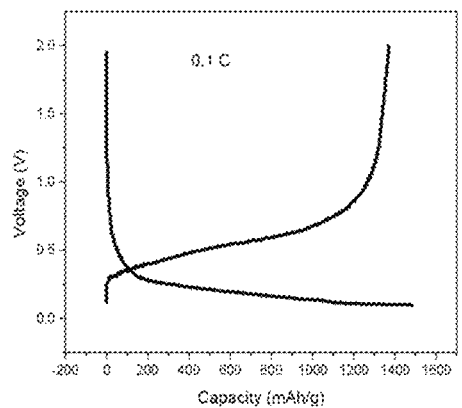
Fig. 5a  Fig. 5b

FABRICATION OF Si-MWCNT NANOCOMPOSITES (SMC) AS ANODES FOR LITHIUM-ION BATTERIES

FIELD OF THE INVENTION

The present invention relates to the field of fabrication of anodes for lithium-ion batteries, and more particularly to the fabrication of Si-MWCNT nanocomposites (SMC) as anodes for lithium-ion batteries.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Growing worldwide demand for energy, and problems of scarcity and environmental impact associated with conventional sources are at the base of a very probable energy crisis in the next two or three decades. At present, it is not possible to abandon any existing energy sources, and these must receive the necessary modifications to eliminate or reduce their environmental impact, and new strategies must be added to resolve the issues of energy. Along the same line, the automotive sector around the globe aims to replace all vehicles with zero-emission electric vehicles for environment-friendly sustainable transport. Lithium (Li)-ion batteries (LIBs), which are the most dominating energy storage systems in portable electronic devices are capable of combatting the issue of $CO_2$ emissions and climate change by further development for use in electric vehicles. Moreover, these rechargeable batteries are considered significant power sources for electrical systems in military as well as civilian applications. Li-ion batteries are able to be recharged hundreds of times and are more stable. They tend to have a higher energy density, voltage capacity and lower self-discharge rate than other rechargeable batteries. This makes for better power efficiency as a single cell has longer charge retention than other battery types.

The energy density of Li-ion batteries depends upon the specific capacities of anodes and cathodes materials. As specific capacity of currently used graphite anode is low for large-scale applications of electric vehicles, it requires a large number of graphite-based cells to provide the energy needed leading to heavier battery packs. Silicon (Si) anode battery is an extension of Li-ion batteries. These batteries are also called next-generation Li-ion batteries. Utilizing Si as an anode in batteries offers more than ten times theoretical capacities as compared to the conventional Li-ion batteries. This results in significantly higher energy storage and longer battery life. Si anode batteries are used in various applications which include industrial, consumer electronics, automotive, and grid & renewable energy. Si is known to have highest theoretical specific capacity of 4200 mAh/g which is about ten times greater than that of commercial graphite anodes which is 372 mAh/g. However, Si as anode material for Li-ion batteries has its limitations which need to be investigated and overcome. During charging as the Si anodes take up large number of lithium ions upon full lithiation, it tends to expand about 300-400% in volume inducing mechanical stresses. This causes the Si anode to break apart and lose electrical contact between particles to become electrically insulating which reduces efficiency and limits cycle life of Si-based Li-ion batteries.

A few issues of Si that limit practical applications of Si as anodes for Li-ion batteries include silicon volume expansion/contraction stresses induced during lithiation (process of combining or impregnating with lithium or a lithium compound lithiated water)/de-lithiation causing cracks and breakage, low electrical conductivity of silicon due to loss of electrical contact resulting in slowing down diffusion rate of lithium in silicon, irreversible rapid capacity degradation over a few cycles, poor cycling performance and mechanical instability of solid-electrolyte interphase (SEI) formed on the anode. Various mechanisms of Si electrode failure include pulverization and cracking of Si, continuous SEI growth, and morphology and volume change of the entire Si electrode.

Various forms of Si-carbon (C) composite anode materials have been studied and introduced in the past to address the problems of performance of silicon over a numerous charge-discharge cycles. Transforming Si into a nanostructure can shorten the diffusion distances of Li+ ions and electrons, enhancing their kinetics for high electroactivity towards Si uptake/release. Surface modification of Si nanostructures by coating obstruct a physical pathway between electrolyte and Si improves the electrical conductivity between Si particles and increases the surface area. The structure of carbon employed in the coating of Si nanoparticles determines its physical and chemical properties such as its higher electrical conductivity, stability towards various electrolytes and mechanical pliability. Carbon structure can be amorphous which mainly serves the purpose of being a conductive material when incorporated in the layering of Si nanoparticles. However, since the bonding of amorphous carbon is not strong enough to hold the structure together during Si anode expansion, other protective carbon layering of carbon nanotube structure or graphitic carbon layer structure are employed which have high bond strength to buffer Si volume expansion. Most of the previous studies on basic mechanical mixing or coating of Si with carbon have not successfully demonstrated improved cyclic stability. It has been noted that methods such as encapsulating Si within carbon, binding or layering of carbon matrix with Si nanoparticles dispersed within inter-shells address the problems of SEI stability, volume expansion and electrical conductivity for improved battery performance. One such approach includes fabricating Si—C hybrid nanocomposite with double matrix carbon reported high-capacity retention of about 80% for 500 cycles with high initial coulombic efficiency (~80%) and charge capacity (1,800 mAh/g) attained. However, the process of coating surface of Si nanoparticles with carbon materials to fabricate Si—C composites to avoid the issues of Si nanoparticles for the anode applications requires the well-established and reproducible process that enables deposition of carbon films with optimized uniform thickness, which affect cost of producing Si—C composites for the anode applications.

Accordingly, there exists a need for a method/process of fabrication of Si anodes for batteries, which overcomes the drawbacks faced by traditionally employed methods/processes.

SUMMARY OF THE INVENTION

Therefore it is an object of the present invention to propose a method/process of fabrication of Si anodes for batteries, which overcomes the drawbacks faced by traditionally employed methods/processes.

There is a disclosed hybrid composite anode for lithium-ion batteries comprising silicon nanoparticles, multi-walled carbon nanotube (MWCNTs) flakes, and a polymer binder which enables enhanced capacity retention of the hybrid composite anode.

In an embodiment of the present invention, the silicon nanoparticles are in crystal form, and the polymer binder is a polyacrylic acid (PAA)-derived polymer binder.

In an embodiment of the present invention, size of the silicon nanoparticles is 50-60 nm in diameter, and the silicon nanoparticles are inherent nanoparticles without carbon coating.

In an embodiment of the present invention, an optimum composition of the silicon nanoparticles is 60% wt % of silicon, an optimum composition of the multi-walled carbon nanotube (MWCNTs) flakes is 20% wt % of MWCNTs and an optimum composition of the polymer binder is 20% wt % of polyacrylic acid (PAA).

In an embodiment of the present invention, the MWCNTs comprise 92-93% MWCNTs and 6-7 wt % polyethylene glycol (PEG), wherein the PEG serves as a wetting and dispersant agent.

In an embodiment of the present invention, the MWCNT flakes have an outer (inner) diameter of 12.4 (6.4) nm and is 8-10 microns in length.

As another aspect of the present invention, a process of fabrication of an anode for a lithium-ion battery is disclosed, the process comprising the steps of fabricating carbon nanotube (CNT) mats on an anode current collector, dispersing the fabricated CNT mats in a mixture of deionized (DI) water to ethanol using a probe sonicator and magnetic stirrer; and adding silicon nanoparticles, multi-walled carbon nanotube (MWCNTs) flakes, and a polymer binder to the mixture, forming Si-MWCNT nanocomposite (SMC) anodes.

In an embodiment of the present invention, the CNT mats are fabricated on the anode current collector using a tape-casting process or a doctor-blading process.

In another embodiment of the present invention, the anode current collector is a copper foil.

In another embodiment of the present invention, the mixture of DI water to ethanol is a 1:1 100 mL DI water to ethanol mixture.

In another embodiment, the polymer binder is a polyacrylic acid (PAA)-derived polymer binder.

In another embodiment of the present invention, the proposed process of fabrication further comprises placing the SMC anodes in a vacuum oven to remove air bubbles generated by the probe sonicator; casting the SMC anodes on a glass plate covered with a copper foil and placing the glass plate in an oven at 120°.

In another embodiment of the present invention, the formed Si-MWCNT nanocomposite (SMC) anodes comprises a cross-linked MWCNTs matrix, providing a densely packed morphology, which results in efficient and rapid electron transportation.

In another embodiment of the present invention, the densely packed morphology is owing to the addition of the polymer binder which strengthens the crosslinking with the help of hydrogen bonding.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 4 shows a photograph of the SMC fabricated on Cu foil as anode current collector, in accordance with the present invention.

FIGS. 5a-5b depict a half-cell with Si (60%): PAA (20%): CNT (20%) SMC electrode cycling performance and charge/discharge curves at a C rate 0.1 C, in accordance with the present invention.

DETAILED DESCRIPTION OF THE INVENTION

Figure 1:
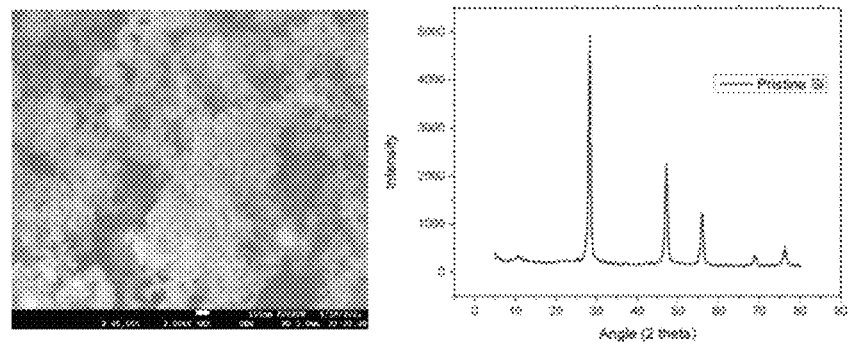
FIG. 1 illustrates shows an image of pristine Si nanoparticles (left) and XRD patterns of pristine Si nanoparticles (right), in accordance with the present invention (scale bar of the SEM image is 100 nm).

The aspects of a method/process of fabrication of anodes for lithium-ion batteries, and more particularly to the fabrication of Si-MWCNT nanocomposites (SMC) as anodes for lithium-ion batteries, according to the present invention will be described in conjunction with FIG. 1-5. In the detailed description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Nowadays, a higher energy density of rechargeable battery is becoming much more desired because of the increasing demands from the coming mobility applications including electric vehicles (EVs). Lithium-ion batteries (LIBs) were first marketed by Sony in 1991 and have come to be the most prevalent rechargeable battery in vehicles, just as they are in mobile phones and laptops. They are more efficient and have longer lifetimes—between 15 and 20 years, about three times that of a traditional lead-acid battery. In particular, LIBs store more energy and are also much lighter, meaning a vehicle equipped with one uses less energy to move. Energy density of LIBs depends upon the specific capacities of anodes and cathodes materials. However, current LIBs based on cathode chemistry leave relatively little room to further enhance the energy density because the specific capacities of these cathodes already approach the theoretical levels. Silicon (Si) anodes have been getting much more attractive due to their high capacity. As specific capacity of currently used graphite anode is low for large-scale applications of EVs, it requires many graphite-based cells to provide the energy needed leading to heavier battery packs. Among various anode materials investigated, silicon (Si) is known to have highest theoretical specific capacity of 4,200 mAh/g which is about ten times greater than that of commercial graphite anodes which is 372 mAh/g. However, silicon as anode material for LIBs has its limitations which need to be investigated and overcome, and the volume expansion problem of Si anode makes it challenging for practical applications.

In accordance with the present invention—compared with Si—C hybrid composite anodes, multi-walled carbon nanotubes (MWCNTs) are employed to fabricate Si-MWCNT nanocomposites (SMC) due to their higher capacity, which improves electronic conductivity and cyclic stability. The use of Si nanoparticles with MWCNTs has an essential role in achieving high specific capacity of the anode with higher cyclic stability. During charging, Li intercalation occurs in case of anode which causes volume expansion of Si structure deteriorating it. Therefore, SMC incorporate voids in the electrode structure to allow for volume expansion and contraction of Si nanoparticles. Such SMC alleviates the mechanical stresses induced during volume changes so the anode structure remains intact. MWCNTs are shown to have a three-dimensional extensive conductive network, which reduces residual stresses due to volume changes during the charge-discharge process. The multipoint physical contact between randomly dispersed Si nanoparticles with MWCNTs improves electrical conduction of silicon and reduces the diffusion distance for Li+ ions. Moreover, the conductivity of MWCNTs is reported to be higher than graphite by at least one order of magnitude so MWCNTs can improve electrical conduction and promotes faster diffusion kinetics of Li+ ions within the active material.

Furthermore, the outermost static MWCNTs stabilizes the solid-electrolyte interphase (SEI) by providing protection from electrolyte infiltration. The formation of stable SEI protects the electrode against direct transfer of electrons from the anode to electrolyte and solvent decomposition. Hence, the SMC accommodates the volume changes of Si nanoparticle and stabilizes the SEI over many charge cycles. Investigation of desirable combination of binders with a high elastic modulus is also a key factor for improved SMC-based battery performance, and polymeric binders have been often incorporated in the electrode matrix which impart mechanical strength by providing strong cohesion between particles in the electrode matrix. They help to maintain the structure of electrode by offering resistance to volumetric changes in the Si particles which can significantly improve the cycling performance of Si-based anodes. Addition of binders is also more affordable than the other methods for Si functionalization. In accordance with the present invention, polyacrylic acid (PAA)-derived polymer binder is the most effective binder for fabrication of Si—C hybrid composite anodes with MWCNTs and enables enhanced capacity retention of the anodes. It has been previously reported that Carboxymethyl Cellulose (CMC) and n-methyl pyrrolidone (NMP) were used as binders for the fabrication of carbon nanotube-based composites for anode applications. CMC is widely used as a thickening agent and electrode binder in battery research, especially for graphite anodes. Compared with traditional polyvinylidene fluoride (PVDF), it can be dissolved in water, which reduces the use of toxic NMP for processing. In the fabrication of the Si/MWCNT nanocomposite anodes in accordance with the present invention, it is found that mixing Si/MWCNT with NMP and CMC resulted in a problem of "non-uniform dispersion", whereas on using PAA as binder for the proposed Si-based CNT anodes, no dispersion problems arise (also proven by chemistry analysis).

Elaborating on the characteristics of PAA as the optimum binder for fabrication of SMC as the anode, in accordance with the present invention, polyacrylic acid (PAA)-derived polymers have shown enhanced capacity retention over 100 cycles as compared to that for carboxyl methyl cellulose (CMC), alginate, and PVDF (polyvinylidene fluoride) binders because of their superior mechanical strength. The PAA binder contains a larger number of —COOH (carboxylic acid) groups that are proposed to have a positive effect on the silicon electrode through hydrogen bonding with the SiOx terminated surface. High concentration of functional (carboxylic) groups in PAA is probably a major cause for its superior performance, and a certain fraction of the COOH groups in PAA form strong hydrogen bonds with OH groups on the Si (or C) surface. The remaining carboxyl groups form ionically conductive COO—Li groups and, together with the solid electrolyte interphase (SEI) formed during the first Li insertion, protect the Si—C interface and thus the anode electrical connectivity from degradation upon solvent intercalation. Considering an electrochemical aspect, the binder has a role on the rate of SEI formation, the SEI composition, and its spatial distribution. Further, the LiF formation rate directly affects the formation of small inorganic SEI species (LiF and sulfides) which percolate through the electrode based again on the bonding strength of the binder. Faster decomposition of the ionic species in the electrolyte for LiF (lithium fluoride) formation, making Fluoride ions (F−) unavailable for subsequent SEI formation cycles. The dual effects of faster consumption of Fluoride ions (F−) to form LiF together with the distribution of passivating sulfides in the SEI could allow for better capacity retention in the PAA binder system as compared to that with CMC. Further improvements have also been established by neutralizing the acidic protons of PAA with LiOH, forming LiPAA, with an average Li substitution of 80%. Doing so may unbundle the polymer chains and possibly improve interactions with the Si surface due to the negatively charged carboxylate.

In accordance with another embodiment of the present invention, fabrication of the anode based on Si-MWCNT nanocomposites (SMC) is disclosed. SMC is fabricated with Si nanoparticles, MWCNT flakes and the Polyacrylic acid (PAA) as binder. Considering the Si nanoparticles, the size of the pristine Si particles is about 50-60 nm in diameter, and crystal quality of the Si particles is indispensable for demonstrating high-energy capacity with low degradation after multiple charge-discharge cyclic tests. The scanning electron microscope (SEM) image is shown along with the quality of polycrystallinity investigated by X-ray diffraction (XRD) is shown in FIG. 1. Considering MWCNT, the MWCNT flakes comprise about 92-93% MWCNTs and 6-7 wt % polyethylene glycol (PEG). The PEG serves as a wetting and dispersant agent, and MWCNT has an outer (inner) diameter of 12.4(6.4) nm and 8-10 microns in length. FIG. 1 illustrates shows an image of pristine Si nanoparticles (left) and XRD patterns of pristine Si nanoparticles (right), in accordance with the present invention (scale bar of the SEM image is 100 nm).

Figure 2:
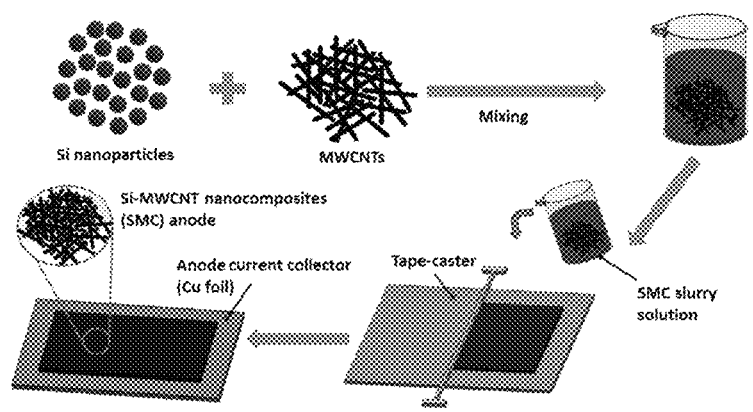
FIG. 2 is a depiction showing the process for the fabrication of SMC anode using the tape-casting method, in accordance with the present invention.

FIG. 2 is a schematic diagram illustrating the process for the fabrication of SMC anodes. The CNT mats on anode current collector (Cu foil) are fabricated using a tape-casting process. CNTs were dispersed in 1:1 100 mL DI water to ethanol using probe sonicator and magnetic stirrer for 10 min. After that 60 wt % of Si nano powders, 20 wt % of MWCNT: 20 wt % of PAA are added and the mixture is sonicated for 10 min only without using the magnetic stirrer. In accordance with the present invention, it is not required to stick to the tape-casting process to fabricate CNT mats on the anode current collector. The CNT mats may also be fabricated on the anode current collector by a simple doctor-blading process, a simple process of coating slurry on the anode current collector. In other words, a sort of doctor-blading process with a thickness control is employed for fabrication of anode materials on anode current collector, however in some scenarios, it is safe to state that the doctor-blading process is similar to the tape-casting process. Traditionally, some disadvantages associated with the tape-casting process includes molds having low toughness and high porosity, which then lowers the strength of the fabricated end-product. However, the tape-casting process referred to in the present invention does not require any molds, and in contrast, the tape-casting process in accordance with the present invention is a casting process used in the manufacture of thin ceramic tapes and sheets from ceramic slurry. The ceramic slurry is cast in a thin layer onto a flat surface and then dried and sintered. Accordingly, issues such as low toughness and high porosity are not applicable for the composites for anodes.

Figure 3:
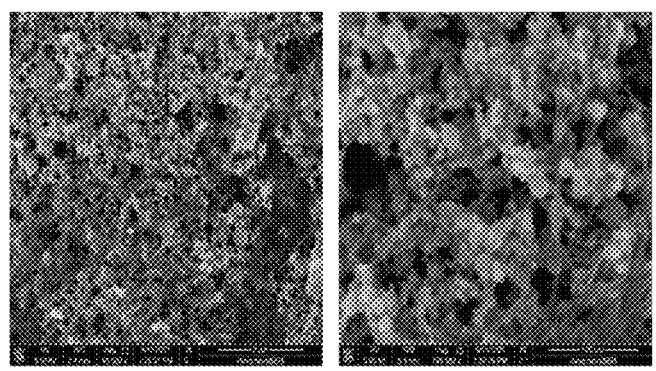
FIG. 3 shows SEM images of Si-MWCNT nanocomposites (SMC) anode—image (left), scale bar of 2 μm and image (right), scale bar of 500 nm.

The mixture is then placed in a vacuum oven for 2 minutes to remove air bubbles generated by the sonicator. After that, the mixture was cast using a doctor blade on a glass plate that is covered with copper foil and placed in the oven for 1 hour at 120° ° C. Loading level of 0.5 to 0.6 mg/cm$^2$ is applied for good cell performance. The Si nanoparticles are embedded in the cross-linked MWCNTs matrix, providing densely packed porous structure of composite electrodes, which results in efficient and rapid electron transportation. The densely packed morphology that is mechanically robust can be attributed to the addition of PAA binder which further strengthens the crosslinking with the help of hydrogen bonding. Hence, enhancing the mobility of electrons during Li+ ions intercalation/de-intercalation. It can also be seen that the electrode with carbon coated Si has a more uniform distribution of elements due to the presence of enhances crosslinking. FIG. 3 shows SEM images of Si-MWCNT nanocomposites (SMC) anode—image (left), scale bar of 2 µm and image (right), scale bar of 500 nm.

Important features of the present invention are as follows:
a. Optimum composition of 3 constituents for nanocomposites anodes—60% wt % of Si, 20 wt % of MWCNT and 20 wt % of PAA (PAA as binder)
b. Requirements for Si particles—50-60 nm in diameter
c. Requirements for MWCNTs—92-93% MWCNTs functionalized by 6-7 wt % polyethylene glycol (PEG), outer (inner) diameter of 12.4(6.4) nm and 8-10 microns in length The PEG serves as a wetting and dispersant agent. MWCNT has an outer (inner) diameter of 12.4 (6.4) nm and is 8-10 microns in length. It is observed that the above numbers or ranges of dimensions and percentages of the materials work best/optimally for fabrication of the Si-composites, yielding high performance. In addition, the proposed Si-based composites for anodes use inherent Si particles—without carbon coating. SMC on Cu foil (anode current collector) may be used for fabrication of pouch cell battery and prismatic battery. FIG. 4 shows the photographs of the SMC fabricated on Cu foil as anode current collector.

In another embodiment of the present invention, an electrochemical test of Si-MWCNT nanocomposites (SMC) is performed. A half-cell battery test was conducted to investigate the cyclic performance of SMC electrode (60% wt % of Si: 20 wt % of MWCNT: 20 wt % of PAA) with Li metal as anode, which is shown in FIG. 5a at a C-rate of 0.05 C for first 3 cycles, 0.1 C for next 10 cycles and 0.2 C for last 20 cycles. FIG. 5b displays the galvanostatic charge-discharge voltage profiles of half-cells with the same Si—C composite free standing electrode at a C rate of 0.1 C between 0.1 to 2 V vs. Li+/Li (Electrolyte 1M LiPF6 in EC/DEC=50/50). As shown in FIG. 5a, the SMC demonstrate the specific capacity of above 1,200 mAh/g even after 40 cycles with less than 10% of degradation at a C rate of 0.2 C. The present invention has successfully demonstrated Si-based anode with even 40% of Si materials. In addition, the process for fabrication of such high percentages of Si SMC nanocomposites anodes is much simpler than work done traditionally, with low temperature, less process steps, etc. (more Si materials in the anode leads to larger specific capacity and faster charging LIBs).

The charging process in full cell involves the mechanism of lithiation of anode and de-lithiation of cathode which is associated with huge volume expansion of the Si anode that can host about 4.4 Li atoms per Si atom to form Li22Si5 reaching its maximum theoretical capacity. Consequently, the large volume expansion/contraction usually causes mechanical fracture and pulverization of Si, resulting in unstable SEI and loss of inter particle and current collector electrical contact which ultimately leads to low Coulombic efficiency and irreversible rapid capacity degradation. Furthermore, the Li+ ions insertion-produced large deformation and elastic strain lead to pulverization or change in morphology of electrodes, which eventually slow down the kinetics of lithiation process. This also leads to poor cyclic performance of the battery A prototype of the Si based on engineered anodes has been successfully demonstrated. The proposed SMC possesses superior performance at present such as incorporation of largest amount of Si materials into the anode and the process is easy to be scale-up for enabling the high throughput process with low cost. The process for fabrication of SMC is compatible to the existing processes for manufacturing of Si anodes for LIBs. However, applications of more strategies enable enhance further performance of Li-ion batteries with SMC. For the invention to be developed and industrialized, some of the issues may need to be resolved such as the availability of Si nanoparticles with good quality, and optimization of balancing materials of 'active' cathode and anode for integration of full-cell Li-ion batteries with high capacity and fast-charging capability. The proposed process for fabrication of nanocomposite anodes is quick—less than 1.5 hours for completion of a single batch and using low temperature (max. temperature required being 120° C.). The process is compatible with the currently used production line set-up for producing anodes for Li-ion batteries (simple slurry coating process with baking). At present, high Ni-based cathode materials (ex: NMC, NCA, etc.) are well employed with carbon-based additives and binder without MWCNTs. However, there is a limit to increase the capacity of the full-cell batteries with high Ni-based cathode materials. In other words, capacity of even Ni-based cathode materials is reaching already theoretical limit. In contrast, high percentage Si-based anode materials have not been successfully implemented for commercial high-capacity battery applications yet (though silicon anode's theoretical capacity is over 3,600 mAh/g—10× higher than capacity of graphite, leading to long range driving/fast charging for EVs). To summarize, the proposed invention discloses a simple process of mixing the optimum/right size or amount of Si particles, MWCNTs, and binder (PAA) to fabricate high energy density Si-based composite anodes. The proposed invention does not involve a lengthy or high temperature process.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A hybrid composite anode for lithium-ion batteries comprising a current collector and a carbon nanotube (CNT) mat; the CNT mat comprising 60 wt % silicon nanoparticles, 20 wt % multi-walled carbon nanotube (MWCNTs) flakes, and a polymer binder, wherein the polymer binder comprises a polyacrylic acid (PAA)-derived polymer binder, which enables enhanced capacity retention of the hybrid composite anode.

2. The hybrid composite anode of claim 1, wherein the silicon nanoparticles are in crystal form.

3. The hybrid composite anode of claim 1, wherein a size of the silicon nanoparticles is 50-60 nm in diameter.

4. The hybrid composite anode of claim 1, wherein the silicon nanoparticles are inherent nanoparticles without carbon coating.

5. The hybrid composite anode of claim 1, wherein the CNT mat comprises 20 wt % of the polymer binder and wherein the polymer binder is polyacrylic acid (PAA).

6. The hybrid composite anode of claim 1, wherein the MWCNT flakes comprise 92-93% multi-walled carbon nanotubes (MWCNTs) functionalized with 6-7 wt % polyethylene glycol (PEG).

7. The hybrid composite anode of claim 6, wherein the PEG serves as a wetting and dispersion agent.

* * * * *